United States Patent
Froeschke

[11] Patent Number: 6,162,036
[45] Date of Patent: Dec. 19, 2000

[54] DROP FORMER HAVING A MECHANISM FOR RECIRCULATING RESIDUAL MOLTEN MATERIAL

[75] Inventor: Reinhard Froeschke, Ulrichstrasse, Germany

[73] Assignee: Santrade Ltd., Luzern, Switzerland

[21] Appl. No.: 09/150,726

[22] Filed: Sep. 10, 1998

[30] Foreign Application Priority Data

Sep. 18, 1997 [DE] Germany ............ 197 41 076

[51] Int. Cl.⁷ .................................................. B29B 9/10
[52] U.S. Cl. ................................. 425/6; 425/217; 264/8
[58] Field of Search ........................ 425/6, 217, 218, 425/220, 215, 216; 264/5, 8, 13, 37.1; 118/257

[56] References Cited

U.S. PATENT DOCUMENTS

| | | | |
|---|---|---|---|
| 2,375,191 | 5/1945 | Bower | 425/217 |
| 4,279,579 | 7/1981 | Froeschke | 425/6 |
| 4,559,000 | 12/1985 | Froeschke | 425/6 |
| 4,610,615 | 9/1986 | Froeschke | 264/8 |
| 5,591,458 | 1/1997 | Froeschke et al. | 425/6 |
| 5,637,350 | 6/1997 | Ross | 264/8 |

FOREIGN PATENT DOCUMENTS

| | | |
|---|---|---|
| 62-129137 | 6/1987 | Japan . |
| 11 89 493 | 7/1982 | U.S.S.R. . |
| 12 55 193 | 2/1984 | U.S.S.R. . |

*Primary Examiner*—Harold Pyon
*Assistant Examiner*—Thukhanh T. Nguyen
*Attorney, Agent, or Firm*—Burns, Doane, Swecker & Mathis, L.L.P.

[57] ABSTRACT

A drop former includes a supply vessel having bottom discharge openings for discharging a free-flowing viscous mass. An endless perforated belt rotates around front and rear guide drums such that a lower run of the belt travels toward the rear guide drum while passing across the discharge openings of the vessel to periodically open those openings and allow drops of the mass to fall onto a cooling conveyor. A collecting space is formed beneath the rear guide drum for collecting residual mass from the belt. A recirculation mechanism recirculates that collected residual mass back to a location adjacent the discharge openings.

10 Claims, 5 Drawing Sheets

DROP FORMER HAVING A MECHANISM FOR RECIRCULATING RESIDUAL MOLTEN MATERIAL

BACKGROUND OF THE INVENTION

The present invention relates to a belt-type drop former apparatus for producing granules from a freeflowing viscous mass. The mass is reduced to the form of drops that fall onto a cooling surface where they solidify and gel. Such an apparatus conventionally comprises a supply vessel to which the freeflowing mass is supplied, the vessel having outlet openings which are intermittently opened and closed by the lower run of an endless perforated belt guided on front and rear guide drums. That lower run travels from the front guide drum to the rear guide drum and passes across the outlet openings of the supply vessel. When openings of the belt are aligned with the outlet openings of the supply vessel, the mass falls therethrough to form the drops. A collecting device is arranged for collecting the residual material which does not fall from the belt. Rather, the residual material is discharged from the openings of the belt as the belt travels around the circumference of a rear guide drum. The collecting device embraces at least part of the outer circumference of both the guide drum and the belt, and conducts the collected material to a collecting channel intended for delivering the collected residual material onto the perforated belt upstream of the supply vessel.

A belt-type drop former of this kind has been known from U.S. Pat. No. 5,591,458 wherein collecting walls are provided inside the endless perforated belt. The collecting walls converge downwardly in V shape from the two guide drums to a collecting channel arranged upstream of the supply vessel (i.e., the vessel having the outlet openings for the material to be dropped, which material is supplied to it from the side). It has been found that such collecting walls are not absolutely necessary, being capable only of returning the material that drops down from the upper run because the largest part of the residual material that has not already been discharged through the openings of the belt during the dropping process as such has been previously discharged at the first guide drum. The latter, being arranged downstream of the supply vessel, viewed in the running direction of the lower run of the perforated belt, is however likewise provided with a collecting means. Notwithstanding the schematic depiction in U.S. Pat. No. 5,591,458 of a conduit extending from that collecting means to a collecting channel located upstream of the supply vessel, the task of returning residual material through such a channel is not easily performed.

The present intention, therefore, has for its object to design an apparatus of the before-mentioned kind in such a way that the residual material collected by the collecting means at the first guide drum, i.e. the rear drum viewed in the running direction of the belt, can be returned easily, but in a safe way, to the collecting channel arranged upstream of the supply vessel.

SUMMARY OF THE INVENTION

This object is achieved in a device of the before-mentioned kind by the fact that the collecting device is provided with a collecting space located below the guide drum and that that collecting space communicates with a recirculation mechanism by which any residual material collected in that space is recirculated to the area of the outlet openings. This can be achieved by the fact that the residual material is raised and delivered into a recirculation channel, that opens into a collecting channel through a discharge opening located at a higher level than the collecting channel provided upstream of the vessel with the outlet openings.

This configuration has the result that the collected residual material is forcedly raised to a higher level from where it can be guided into the collecting channel without any difficulty, under the effect of gravity, via a recirculating channel.

According to a further development of the invention it has been found to be of advantage to use a bucket wheel, that dips into the collecting space, as a conveyor means.

It is convenient in this case to arrange the recirculating channel on the same side of the perforated belt as the bucket wheel and the collecting space.

According to a further development of the invention, the bucket wheel may also be arranged in a housing that comprises at least part of the collecting space with an inlet opening for the residual material and, at a higher level, the discharge opening. By arranging the bucket wheel in a housing, it is possible to achieve a feeding effect similar to that of a star feeder, which guarantees that the residual material can be lifted to a higher static head. The housing may of course be equipped with a heating device for maintaining the residual material at a temperature that permits it to flow back.

According to a further development of the invention, the bucket wheel may be seated on the drive shaft of the guide drum and may be driven in the same sense as the latter. This results in a space-saving structure which finally also permits the bucket wheel to be fixed on the drive shaft of the guide drum and to be driven together with the latter. One thereby circumvents any greater input that would normally be required for raising the residual material to a higher level.

According to a further development of the invention, the recirculating channel may communicate with a channel-like scraper strip in contact with the circumference of the guide drum and arranged on the inner side of the guide drum opposite the collecting device. This scraper strip acts to clean the guide drum, as it rotates, from any residual material adhering to it, which is then returned to the collecting channel. The scraper strip may of course, just as all other elements that get into contact with the free-flowing mass, be heated in order to maintain the viscosity of the material at a level that keeps it in a freeflowing condition so that it can be recirculated to the collecting channel.

According to a different embodiment of the invention, the feeder means may be constituted by a pump arranged in a recirculating line that leads from the collecting space to the vessel with the discharge openings.

BRIEF DESCRIPTION OF THE DRAWING

The invention will be described hereafter with reference to one embodiment shown in the drawing in which.

DETAILED DESCRIPTION OF PREFERRED EMBODIMENTS OF THE INVENTION

Figure 1:
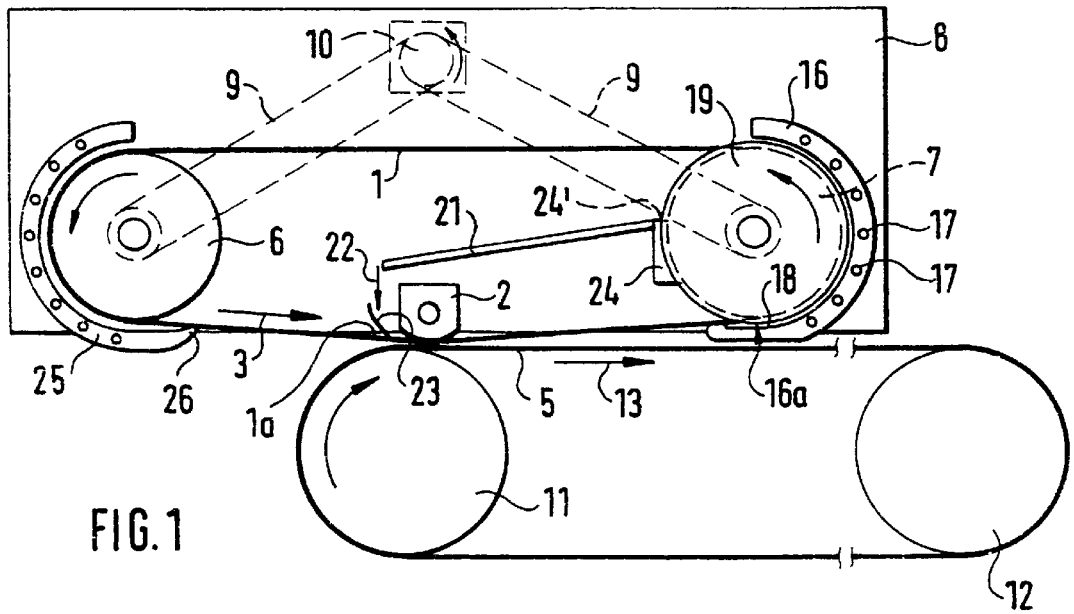
FIG. 1 shows a diagrammatic representation of an apparatus according to the invention.
Figure 2:
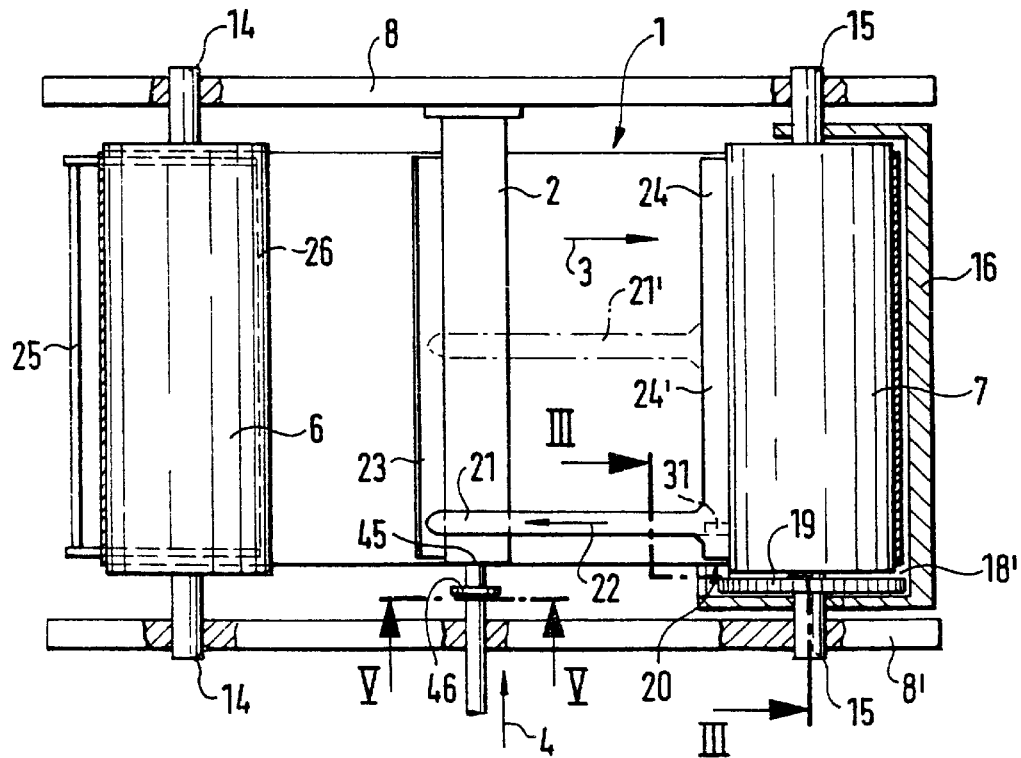
FIG. 2 shows a top view of the apparatus according to FIG. 1, but without the upper run of the perforated belt and without the conveyor belt.

FIGS. 1 and 2 show that the new belt-type drop former for producing granules comprises an endless perforated belt 1, whose lower run 1a coacts with a tube-like supply vessel 2 that extends transversely to the running direction 3 of the belt 1. The vessel is provided, on its side contacting the belt, in a manner not shown in detail, with a plurality of outlet openings through which the material to be processed, being supplied to the vessel in the direction indicated by arrow 4, can drop onto a cooling belt 5 and transported away by the latter. During this process, the openings (not shown) of the vessel 2 are intermittently opened and closed by the openings (not shown) of the perforated belt 1 so as to enable the drops to be formed.

The perforated belt 1 is guided about front and rear guide drums 6 and 7 in a manner such that its lower run 1 a rests against the vessel 2 with a certain tension. Both guide drums 6 and 7 are driven in the illustrated example. They are rotatably seated in lateral supporting walls 8, 8', in a manner not shown in detail, and are driven via belts or chains 9 by a motor 10 which is likewise seated on the wall 8 or firmly arranged in a housing formed by an upper cover, not shown, and the walls 8, 8'. The guide drums 6 and 7, or at least one of them, are additionally supported in such a way that the distance between the axes of the two guide drums 6 and 7 can be varied in order to permit the tension of the perforated belt 1 to be adjusted.

The cooling belt 5, whose cooling means are not shown in the drawing, is likewise guided about guide drums 11 and 12 both rotating clockwise in FIG. 1 so that the sense of movement 13 of the upper run of the cooling belt 5 corresponds to the sense of movement 3 of the lower run 1a of the perforated belt 1. The running speeds of the cooling belt 5 and the perforated belt 1 are substantially equal.

Figure 3:
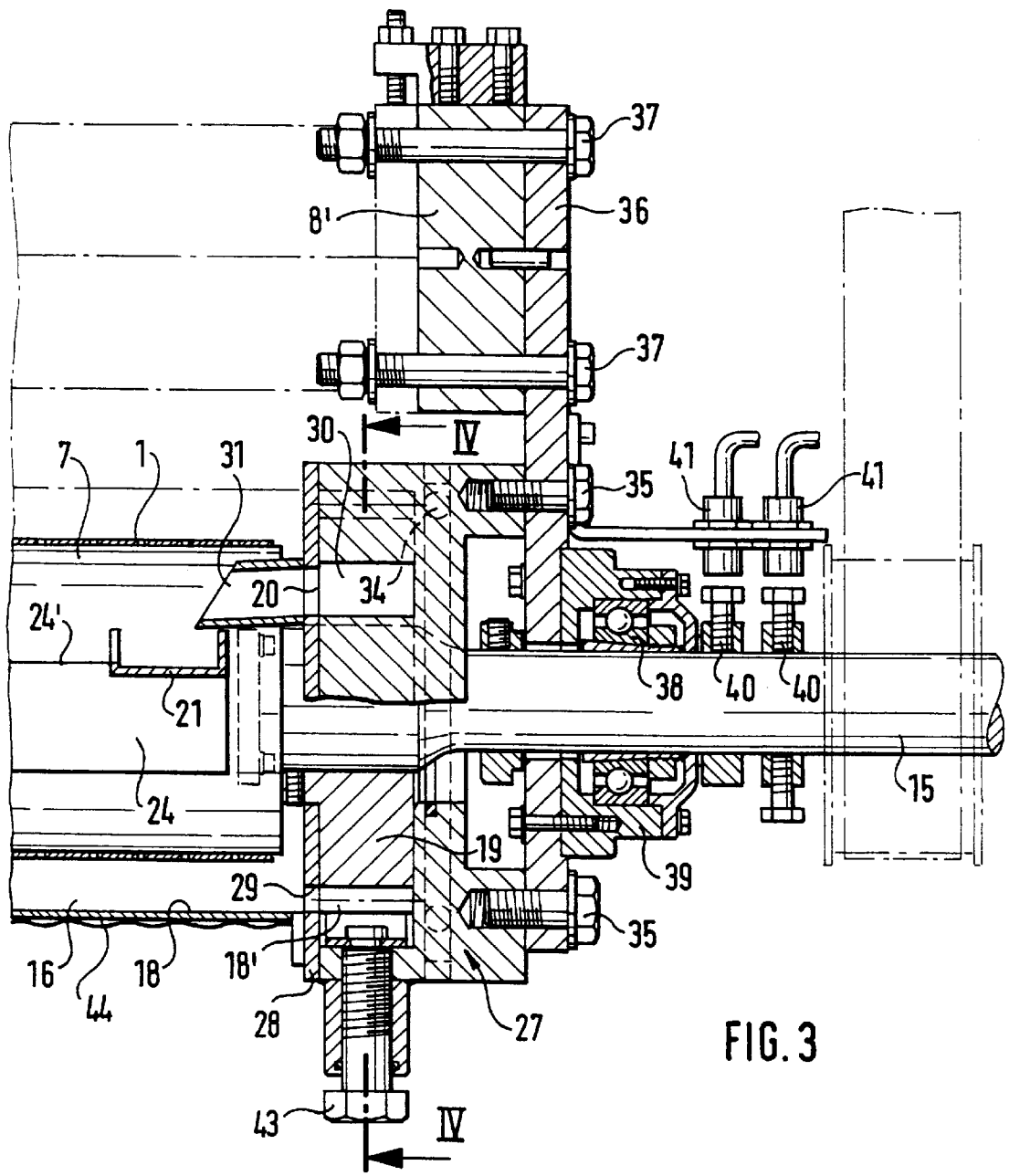
FIG. 3 shows an enlarged cross-section, taken along line III—III in FIG. 2, of one practical embodiment of the invention.
Figure 4:
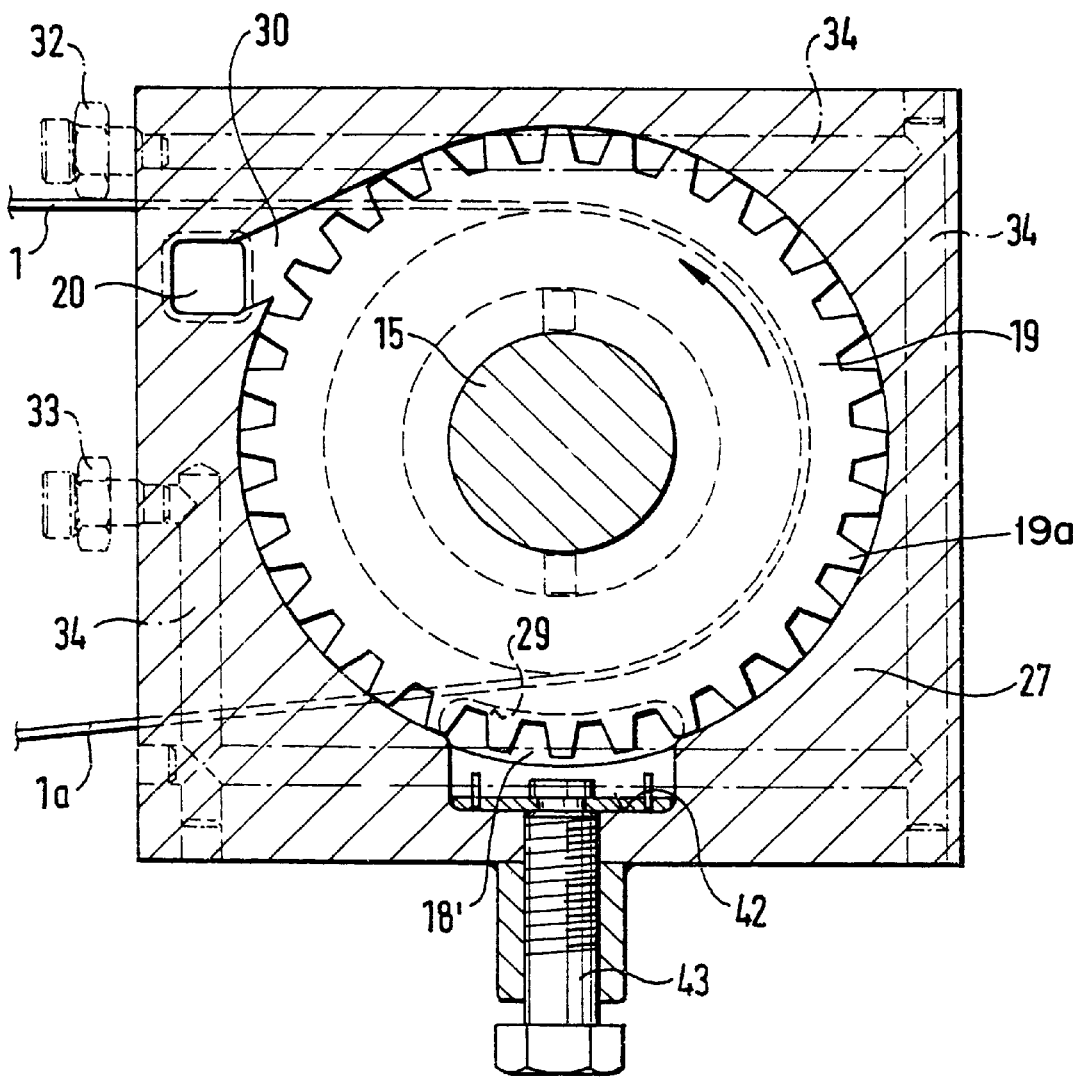
FIG. 4 shows a cross-section along line IV—IV in FIG. 3.

From FIG. 2 it can be seen that the ends of the drive shafts 14 and 15 of the guide drums 6 and 7 are seated in supporting walls 8, 8'. Likewise, the tube-shaped vessel 2 is supported on both supporting walls 8, 8'. The guide drum 7, i.e. the rear guide drum viewed in the running direction 3 of the lower run 1a of the perforated belt 1, has associated with it a collecting means in the form of a substantially semi-cylindrical hood 16, traversed by flow channels 17 for conducting a heating medium. The hood 16 encompasses the guide drum 7 at least over part of the lower circumferential portion of the drum. Any residual material from the openings of the perforated belt that has not dropped onto the cooling belt 5 can now drop through those openings in the area of the hood 16, as the belt 1 is deflected around the guide drum 7. That material will be collected in the hood 16 and fed to the lower area 16a of the latter, where the hood 16 forms a channel constituting a collecting space 18. At the end of the collecting space adjacent the supporting wall 8', the collecting space 18 is deeper and forms a lateral collecting space 18' into which a bucket wheel 19 firmly connected with the drive shaft 15 of the guide drum 7, dips. As can be seen in FIGS. 3 and 4, the bucket wheel 19 exhibits a shape similar to a toothed wheel, i.e., it has circumferentially spaced radial teeth 19a, and is driven at the same speed and direction as the guide drum 7. It would, however, also be possible to mount that bucket wheel 19 for rotation relative the drive shaft 15 of the guide drum 7 and to arrange for its being driven separately at any suitable speed by the motor 10. The selected design with the bucket wheel fixed directly on the drive shaft 15 is, however, simpler.

The teeth 19a of the bucket wheel 19 form pockets which feed, in a manner that will be described in more detail further below, any residual material collected in the collecting space 18 to a discharge opening 20 from where the material enters into a recirculating channel 21. In that channel 21 the collected residual material is returned, by gravity, in the sense indicated by arrow 22, to a collecting channel 23 arranged immediately upstream of the vessel 2, as will be described in more detail with reference to FIG. 5. In the illustrated embodiment, the recirculating channel 21 extends over the vessel 2 and lies to the inside of the plane of the bucket wheel 19. The discharge opening 20 of the bucket wheel 19 is located at a higher level than the collecting channel 23 to enable the channel 21 to be downwardly inclined to the channel 23.

In the illustrated embodiment, the guide drum 7 is further provided with a scraper strip 24, resting against the circumference of the guide drum 7 and facing the inner space of the drop former enclosed by the perforated belt 1, which belt also encloses the vessel 2. As indicated diagrammatically in the drawing, the scraper strip 24 forms on its upper face a collecting channel 24'. The collecting channel 24' communicates with the recirculating channel 21 and extends below the discharge opening 20 of the bucket wheel 19. Any residual material that has been scraped off the inner smooth circumference of the guide drum 7 by the scraper strip 24, is thus transported, together with any residual material collected in the hood 16, through the recirculating channel 21 and back to the collecting channel 23 where it is once more delivered, at a short distance before the dropping area, onto the inside of the lower run 1a of the perforated belt. Further details in this connection will be provided in the description of FIG. 5.

In addition, however, the outer area of the guide drum 6 is encompassed by a heated, substantially semi-cylindrical hood 25 arranged at a sufficient distance from the belt 1 being deflected by the drum 6. Consequently, any material that may still attach to the belt 1 is returned to a free-flowing state in the area of the hood 25 so that it will be pushed back into the openings of the belt 1 by a guide lip 26, which is pressed against the bottom face of the lower run 1a of the perforated belt 1, for being discharged in downward direction in the form of drops, together with the material arriving from the vessel 2, behind the collecting channel 23 and below the vessel 2.

From FIGS. 3 and 4 it can be seen that the bucket wheel 19 is arranged in a housing 27, which is closed by a cover 28 on the side thereof facing the guide drum 7. The housing 27 forms a substantially cylindrical recess for the bucket wheel 19, the lower part of which comprises that portion 18' of the collecting space which the bucket wheel 19 dips into. The pockets formed by the teeth 19a are closed by surfaces of the housing 27 as the pockets raise the residual mass. The portion 18' communicates via a substantially uniform opening 29, indicated by dashed lines in FIG. 4, with the collecting space under the hood 16, where the residual material detaching from the belt 1 gathers. The recess in the housing 27 opens at the top (FIG. 4) into a substantially tangential guide channel 30 that transforms into the discharge opening 20 which, in the illustrated embodiment, comprises a pipe end 31 that projects toward the guide drum 7 and terminates above the collecting channel 24 and the recirculating channel 21. Any residual material that has been raised by the bucket wheel 19 from the collecting space 18 drops from that pipe end 31 into the recirculating channel 21, from where it can be returned by gravity to the collecting channel 23.

The housing 27 is provided, around the cylindrical recess for the bucket wheel 19, with guide channels for a heating medium, which may be supplied for example through an inlet pipe 32 and discharged from the housing 27 through an outlet pipe 23. The heating channels 34 are formed in a known manner by bores that are subsequently closed from the outside.

The housing 27 is fixed by mounting screws 35 on mounting means 36 the latter fastened to the support wall 8' by means of threaded bolts 37. The mounting 36 also serves for mounting the outer race of a ball-bearing 38 for the drive shaft 15 of the guide drum and the bucket wheel 19. The ball-bearing 38 is screwed for this purpose to the mounting 36 via a bearing bell 39, and is keyed on the drive shaft by its inner race. In addition, radially projecting screws 40, the position of which can be detected by sensors 41 firmly mounted on the mounting 36, are likewise firmly connected with the drive shaft 15. Thus, the speed of the bucket wheel 19 and the guide drum 7 can be determined by means of the sensors 41.

As is clearly apparent from the drawings, the circumference of the bucket wheel 19 is larger than the circumference of the guide drum 7. This permits the bucket wheel 19 to dip into the collecting space 18, located below the guide drum 7, laterally of the latter. The collecting space 18' inside the housing 27 is further provided, in a known manner, with a recess 42 projecting in downward direction opposite the collecting space 18 and serving as a sump for the residual material that can be drained for cleaning purposes by means of a drain screw 43. Besides, it can be further seen in FIG. 3 that the hood 16 exhibits a double-wall design and that the guide channels 44 for the heating medium are formed in bulging portions of one of the two walls which is configured similar to corrugated sheet steel.

Figure 5:
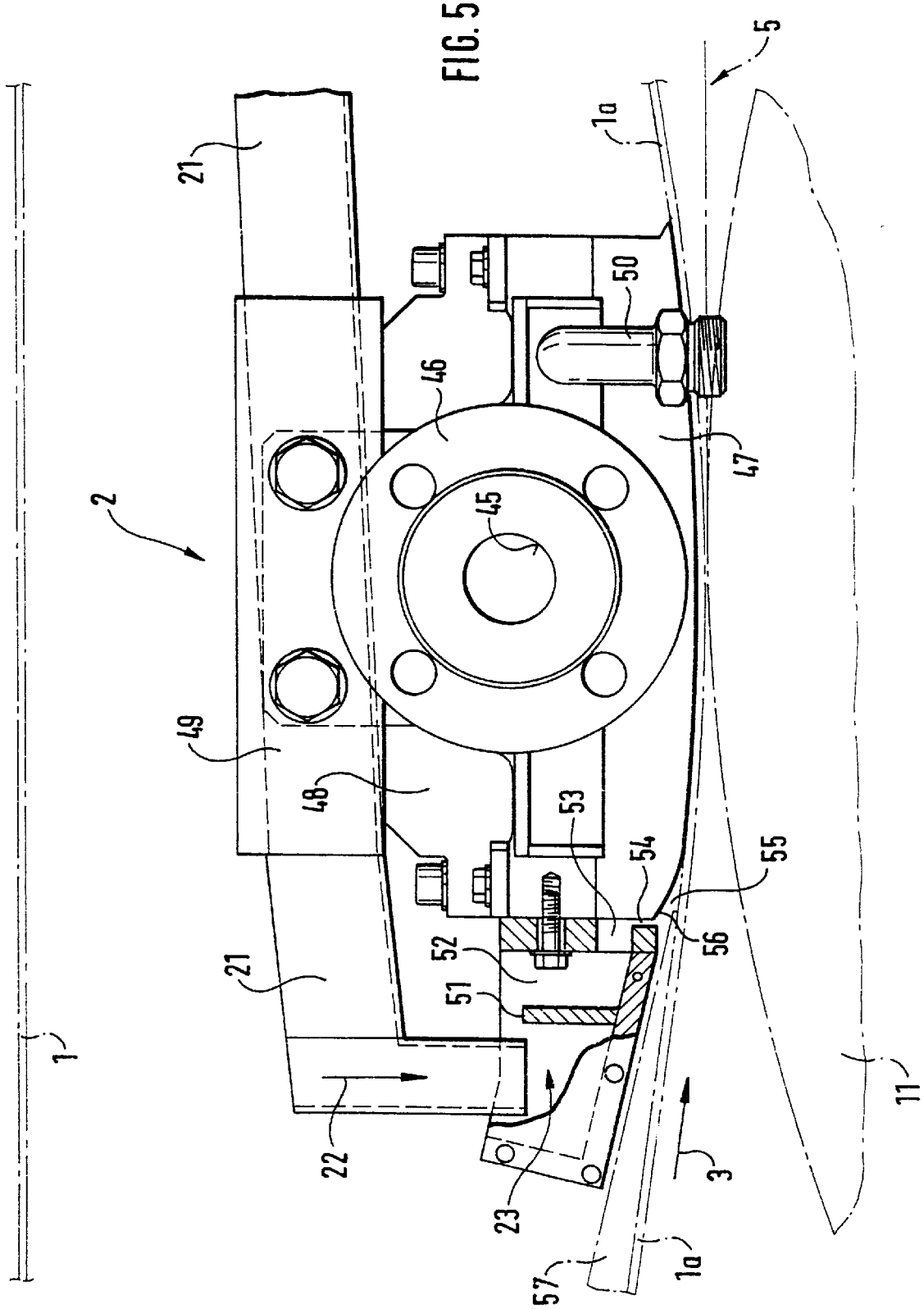
FIG. 5 shows a detail of the apparatus according to FIGS. 1 and 2, with the vessel with the outlet openings and the preceding collecting channel arranged transversely to the running direction of the perforated belt.

FIG. 5 shows that the tube-shaped vessel 2 according to FIGS. 1 and 2 is connected, via an intake bore 45 in a pipe and a flange 46, to a supply line for the material to be processed and that it is provided with a shoe 47, which is curved in downward direction toward the run 1a and is provided with the outlet openings in a manner not shown in detail. On its upper face, the shoe is closed by an upper part 48 screwed to a mounting 49 that serves to hold the vessel 2 between the walls 8, 8'. The vessel is of course also heated. FIG. 5 shows a connection pipe 50 for the heating medium. Viewed in the running direction 3 of the lower run 1a of the perforated belt 1, there is provided, upstream of the shoe 47, the collecting channel 23 which, in the illustrated embodiment, comprises a channel screwed to the housing of the vessel 2 and contains in its interior an overflow weir 51 over which the material arriving from the recirculating channel 21 and guided into the collecting channel 23, in the sense of arrow 22, can flow and enter the space 52 uniformly. From there, an opening 53 leads to a gap 54 between the shoe 47 and the end of the collecting channel 23, and through the gap 54 any material present in the space 52, which is of course held at a given temperature by heating means not shown in detail, can enter the space 55 between the leading edge 56 of the shoe 47 that defines the intake gap 55, and the lower run 1a of the belt 1. As the belt moves, that material is then drawn into the space between the shoe and the lower run 1a and is guided into the openings of the belt from where it can then be discharged in downward direction onto the cooling belt 5 as it passes the openings of the shoe 47, not shown in detail. These openings can be arranged in the known manner as described by U.S. Pat. No. 5,591,458. Further, it is possible, as indicated by the dashed lines, to introduce into the gap 55, i.e. into the space between the lower run 1a and the collecting channel 23, a thin wedge in the form of a plate 57, extending across the width of the belt, which then ensures, if necessary, that any material penetrating trough the gap 54 is also drawn into the gap 55.

In FIG. 5, the distance between the cooling belt 5 and the lower run 1a of the perforated belt 1 is shown to be very small. In this case, the drops forming on the released openings can be entrained by the cooling belt directly. However, it would of course also be possible, and may be necessary depending on the material to be processed, to make the distance between the run 1a and the cooling belt 5 larger. This can be achieved easily by a suitable mounting of the vessel 2. The tension of the belt 1 can be readjusted in the manner described before. In FIGS. 1 and 2, the recirculating channel 21 is provided on the same side of the belt-type drop former as the bucket wheel 19. Such a design is of course of advantage because of the shorter flow path for the residual material from the bucket wheel to the recirculating channel 21. However, it would of course also be possible to discharge the residual material arriving from the bucket wheel 19 into the channel 24' of the scraper strip 24 and to transport it from there to the collecting channel 23 through a return channel located in the middle of the device, as indicated by the return channel 21' shown in dashed lines in FIG. 2.

Figure 6:
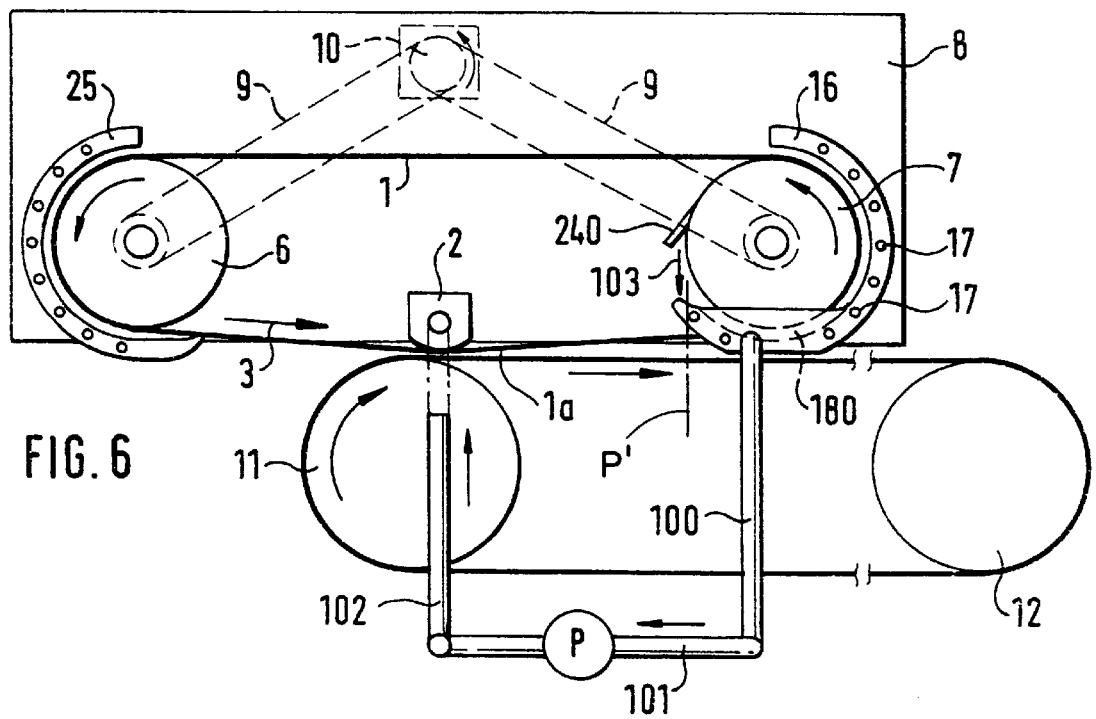
FIG. 6 shows a diagrammatic elevation of a different embodiment of the invention.
Figure 7:
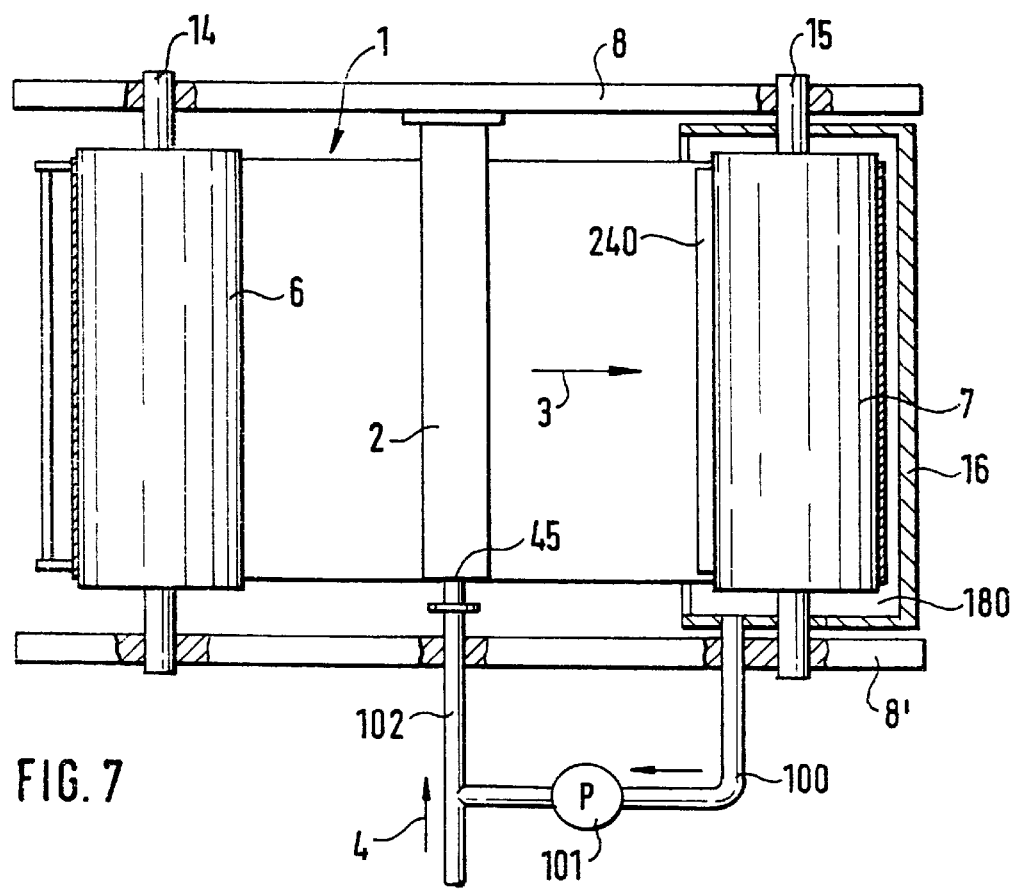
FIG. 7 shows a top view of the apparatus according to FIG. 6.

FIGS. 6 and 7 show another embodiment of a belt-type drop former constructed substantially in the same way as that illustrated in the previously described Figures. Consequently, identical reference numerals have been used for identical parts.

The structure of FIGS. 6 and 7 differs, however, in that the returning of the residual material collected by the hood 16 from the larger collecting space 180 formed below the guide drum 7 is now achieved through a return line 100 leading away from the collecting space 180. Installed in that return line 100 is a pump 101 by means of which the collected residual material can be fed back to the return line 102 through which the mass to be processed is delivered to the vessel 2 in the sense indicated by arrow 4. According to this embodiment of the invention, the collecting space 180 extends up to a point in front of a vertical plane P' that contacts the circumference of the guide drum 7 on the inside of the belt. That is, the plane P' touches a side of the rear guide drum 7 that faces the front guide drum 6. This makes it possible to collect in the collecting space 180 also material that is removed by a scraper strip 240, which may exhibit a design similar to that of the scraper strip 24 of the first embodiment. The residual material form the scraper strip 240 drops from the top to the front end of the collecting space 180, in the sense indicated by arrow 103.

It is of course necessary to heat the return line 100 with the pump 101, and the collecting space as well, to a given temperature in order to maintain the freeflowing state of the residual material. Consequently, these elements are provided with a thermal insulation and with a heating mechanism.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An apparatus for producing granules from a free-flowing viscous mass, comprising:
   a supply vessel including outlet openings for discharging the mass;
   a pair of front and rear rotary guide drums spaced on opposite sides of the supply vessel;
   an endless perforated belt extending around the guide drums and arranged such that a lower run of the belt travels from the front drum to the rear drum while passing across the outlet openings of the supply vessel to periodically open the outlet openings of the supply vessel, as perforations in the belt become aligned with respective discharge openings, whereby the viscous mass falls in the form of drops;
   a collecting device extending around at least a portion of an outer circumference of the rear guide drum whereby the belt travels between the rear guide drum and the collecting device, the collecting device including a collecting space extending beneath the rear guide drum for collecting residual mass falling from the belt; and
   a recirculation mechanism for recirculating the collected residual mass from the collecting space to a return area located adjacent the discharge openings, wherein the recirculation mechanism includes a bucket wheel for raising collected residual mass from the collecting space, and a channel arrangement for conducting the raised residual mass, by gravity, to the return area, the bucket wheel mounted for rotation about an axis of rotation of the rear guide drum, the bucket wheel and the rear guide drum being operably interconnected for simultaneous rotation about the axis, the bucket wheel arranged so that a lower portion thereof dips into the collected residual mass during rotation of the bucket wheel.

2. The apparatus according to claim 1 wherein a portion of the channel arrangement passes over the supply vessel.

3. The apparatus according to claim 2 wherein the channel arrangement includes a recirculation channel having an upper end arranged to receive the raised residual mass from the bucket wheel, and a lower end arranged to discharge the residual mass; the apparatus further including a collecting channel arranged to receive the residual mass discharged from the recirculation channel; the collecting channel having an outlet disposed upstream of the discharge openings for depositing the residual material onto the lower run of the belt.

4. The apparatus according to claim 1 further including a housing, a lower portion of the housing forming the collecting space, the bucket wheel mounted for rotation in the housing, the housing forming an upper outlet for guiding residual mass from the bucket wheel to the channel arrangement.

5. The apparatus according to claim 3 further including a scraper arranged to contact an outer periphery of the rear guide drum for scraping residual mass therefrom.

6. The apparatus according to claim 5 wherein the scraper communicates with the recirculating channel to conduct scraped residual material thereto.

7. The apparatus according to claim 5 wherein the scraper communicates with the collecting channel for conducting scraped residual material thereof.

8. An apparatus for producing granules from a free-flowing viscous mass, comprising:
   a supply vessel including outlet openings for discharging the mass;
   a pair of front and rear rotary guide drums spaced on opposite sides of the supply vessel, the rear guide drum including a front side facing the front guide drum;
   an endless perforated belt extending around the guide drums and arranged such that a lower run of the belt travels from the front drum to the rear drum while passing across the outlet openings of the supply vessel to periodically open the outlet openings of the supply vessel, as perforations in the belt become aligned with respective discharge openings, whereby the viscous mass falls in the form of drops;
   a collecting device extending around at least a portion of an outer circumference of the rear guide drum whereby the belt travels between the belt and the collecting device, the collecting device including a collecting space located beneath the rear guide drum for collecting residual mass falling from the belt; and
   a recirculation mechanism for recirculating the collected residual mass from the collecting space to the supply vessel, wherein the recirculation mechanism comprises a recirculation conduit interconnecting the collecting space and the supply vessel, and a pump for pumping collected residual mass through the recirculation conduit from the collecting space to the supply vessel;
   a lower portion of the collecting device extending beneath the rear guide drum in a forward direction toward the front guide drum, whereby a front end of the collecting space projects forwardly past a vertical plane touching the front side of the rear guide drum that faces the front guide drum;
   a scraper contacting the front side of the rear guide drum at a location above the front end of the collecting space for scraping residual mass from the rear guide drum, the scraped residual mass dropping into the front portion of the collecting space.

9. The apparatus according to claim 1 wherein the bucket wheel is circular and includes circumferentially spaced, generally radially projecting teeth, adjacent ones of the teeth forming pockets for raising the residual mass.

10. The apparatus according to claim 9 wherein the recirculation mechanism further includes a housing having a circular recess formed therein, the bucket wheel disposed in the recess for rotation relative to the housing, the pockets of the bucket wheel being closed by surfaces of the housing defining the recess.

* * * * *